Jan. 8, 1957. K. S. PACKARD 2,777,113
CATHODE RAY TUBE SPOT SIZE MEASUREMENT
Filed April 22, 1955
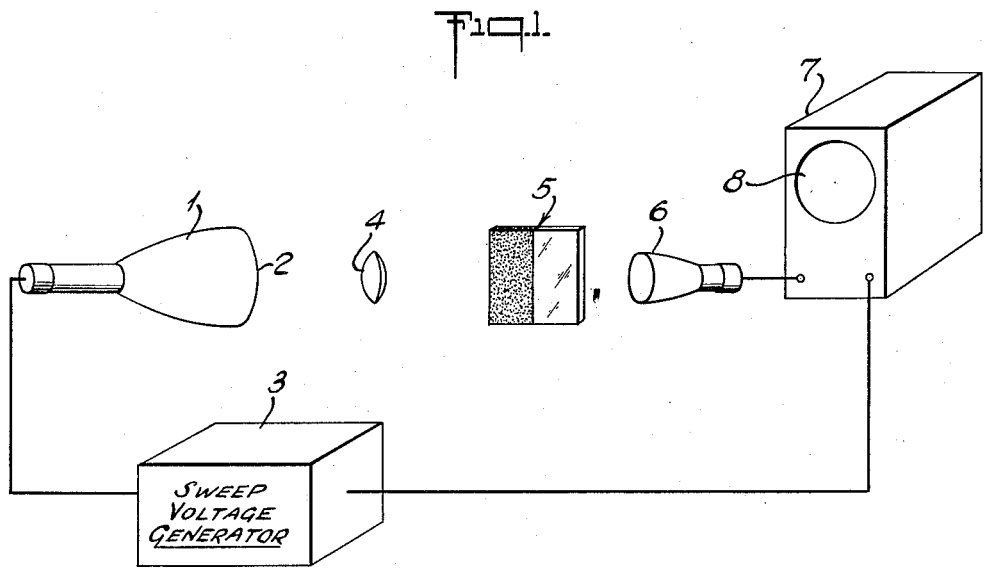
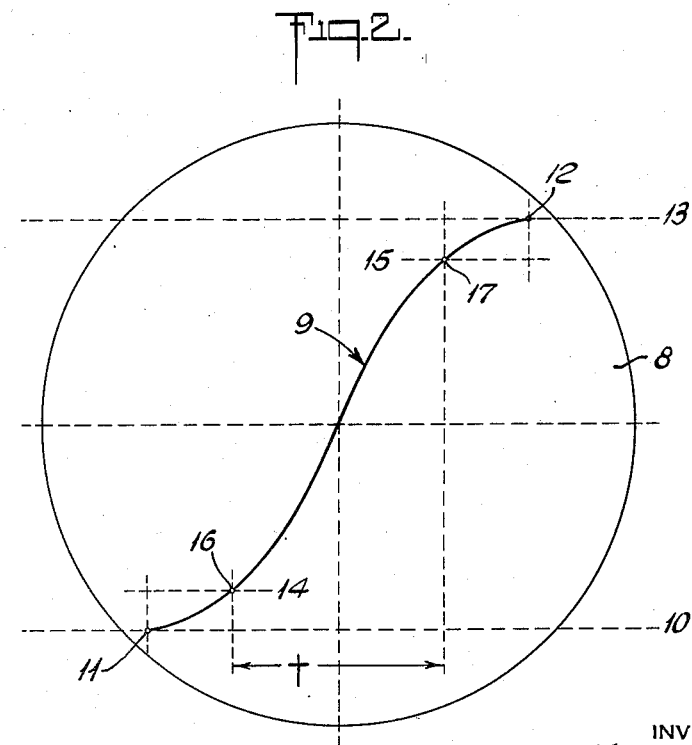
INVENTOR
KARLE S. PACKARD
BY
*Fred J. Huntzberger*
ATTORNEY

United States Patent Office 2,777,113
Patented Jan. 8, 1957

2,777,113

CATHODE RAY TUBE SPOT SIZE MEASUREMENT

Karle S. Packard, Bellmore, N. Y., assignor, by mesne assignments, to the United States of America as represented by the Secretary of the Navy Application April 22, 1955, Serial No. 503,358

2 Claims. (Cl. 324—20)

This invention concerns the measurement of the size of cathode ray tube spots.

The present invention provides a practical method for measuring the size of a cathode ray tube spot produced by the electron bombardment of its luminescent screen.

The principal object of this invention is the provision of a method for cathode ray tube spot size measurement.

An object of this invention is the provision of a method for cathode ray tube spot size measurement which is rapid, efficient and economical in operation.

An object of this invention is the provision of apparatus for cathode ray tube spot size measurement which is of compact and simple construction.

A further object of this invention is the provision of apparatus for cathode ray tube spot size measurement which is readily maintained and transportable.

Other objects and many of the attendant advantages of this invention will be readily appreciated as the same becomes better understood by reference to the following detailed description when considered in connection with the accompanying drawing wherein:

Fig. 1 is the cathode ray tube spot size measurement apparatus of the present invention; and Fig. 2 is the spot size indication curve on the face of the cathode ray oscillograph of the cathode ray tube spot size measurement apparatus of the present invention.

The cathode ray tube 1 is one of a type well known in the art and produces a spot of constant intensity on its luminescent screen 2 by the action of its electron gun, not shown in Fig. 1, in a manner well known in the art. The sweep voltage generator 3 is of a type well known in the art and recurrently sweeps the spot in a horizontal direction on the screen 2 at a constant speed, in a manner well known in the art. The spot is thus maintained at a constant intensity and is recurrently swept across the screen 2 in a horizontal direction at a constant velocity.

The lens 4 focusses the screen 2 spot on the surface of the light masking element 5. The light masking element 5 is a sharp-edged substantially vertical masking element which presents a total barrier to the transmission of light through approximately half its surface area and transmits light without hindrance through the rest of its surface area. The masking element 5 thus presents an opaque substantially vertical edge to the spot of the screen 2, in a manner well known in the art. A suitable mask may embody any opaque material with a well-defined edge.

The phototube 6 is one of a type well known in the art and produces an output voltage which varies with the intensity of light intercepted by its cathode, in a manner well known in the art. The phototube 6 is so positioned behind the masking element 5 that it intercepts the light transmitted by said masking element.

The output voltage of the phototube 6 is applied to the vertical sweep control of the cathode ray oscillograph 7 and the output voltage of the sweep voltage generator 3 is applied to the horizontal sweep control of said cathode ray oscillograph. The cathode ray oscillograph 7 is of a type well known in the art and functions in a manner well known in the art to produce a spot size indication curve on its screen 8.

The distance between the light masking element 5 and the phototube 6 is preferably kept reasonably small in order to keep diffraction effects negligible. One inch has been found to be a suitable distance between the light masking element 5 and the phototube 6.

The lens 4 is necessitated by the presence of parallax. If parallax were reduced or eliminated the masking element 5 could be positioned against the screen 2 of the cathode ray tube 1 and the lens 4 could be dispensed with.

The operation of the cathode ray tube spot size measurement apparatus of the present invention is as follows.

A spot of constant intensity is recurrently swept at a constant velocity in a horizontal direction across the screen 2 of the cathode ray tube 1. The spot is focussed upon, and thus swept across the light masking element 5 which transmits said spot in its entirety to the phototube 6. Since the light masking element 5 presents a substantially vertical sharp opaque edge to the spot, the area of the spot is swept over the edge of said masking element from nothing, at its leading edge, to its entirety, at its trailing edge. The light transmitted by the masking element 5, before the spot reaches its edge, remains constantly zero. As the leading edge of the spot is horizontally swept past the edge of the masking element, from opacity to translucency, light of small intensity is transmitted by said masking element and is intercepted by the phototube 6. As the spot is horizontally swept past the edge of the masking element, from opacity to translucency, light of increasing intensity is transmitted by said masking element and is intercepted by the phototube 6. As the trailing edge of the spot is horizontally swept past the edge of the masking element, from opacity to translucency, light of the maximum intensity is transmitted by said masking element and is intercepted by the phototube 6. The light intercepted by the phototube 6 remains at the maximum intensity of the entire spot until the spot disappears.

A voltage, which varies with the intensity of light intercepted by the phototube 6, is applied to the cathode ray oscillograph 7 and produces a spot size indication curve on its screen 8. The spot size is determined from the spot size indication curve on the screen 8 of the cathode ray oscillograph 7 in a manner described in conjunction with Fig. 2.

Fig. 2 is the spot size indication curve on the face of the cathode ray oscillograph of the cathode ray tube spot size measurement apparatus of the present invention.

The spot size indication curve 9 appears on the screen 8 of the cathode ray oscillograph 7. The curve 9 starts at an even level 10, at zero, before any spot-generated light is transmitted by the masking element 5 to the phototube 6. At the point 11, of the curve 9, the leading edge of the spot is horizontally swept past the edge of the masking element 5; that is, the masking element transmits the small intensity light of the leading edge of the spot to the phototube 6. As the spot is horizontally swept past the edge of the masking element 5, from opacity to translucency, the curve 9 increases in approximately straight line positive slope fashion with the increasing intensity light transmitted by the masking element to the phototube. At the point 12, of the curve 9, the trailing edge of the spot is horizontally swept past the edge of the masking element 5; that is, the masking element transmits the maximum intensity light of the entire spot to the phototube 6. The curve 9 continues, after the point 12, at an even level 13, at maximum transmitted intensity after all the spot-generated light is transmitted by the masking element 5 to the phototube 6.

Thus the curve 9 is a graphical presentation of the interception of the spot-generated light by the phototube from zero to its maximum intensity, as the masking element 5 transmits the spot-generated light at a constant speed, or velocity, from zero to its maximum intensity. The greater the spot area transmitted by the masking element 5, the greater the light intensity transmitted by said masking element and the greater the light intensity intercepted by the phototube 6. The greater the light intensity intercepted by the phototube, the greater the ordinate and abscissa of the curve 9 from its zero point 11.

If the rise time $t$, of the curve 9, is taken as the time required to go from 10 percent of the full peak to peak value to 90 percent of the full peak to peak value, and the velocity $v$ is the velocity of the spot swept across the screen 2 of the cathode ray tube 1, then $$A = \frac{vt}{1.80}$$

where A is the spot size.

If the velocity $v$ is in units of mm. per sec. and the time $t$ is in units of sec. then the area A is in mm. If the velocity $v$ is in units of cm. per sec. and the time $t$ is in units of sec. then the area A is in cm. If the velocity $v$ is in units of mm. per millisecond and the time $t$ is in units of milliseconds then the area A is in mm. If the velocity $v$ is in units of mm. per microsecond and the time $t$ is in units of microseconds then the area A is in mm.

The spot size A is determined from the curve 9 by finding the rise time $t$ from said curve and substituting it for $t$ in the relation $$A = \frac{vt}{1.80}$$

The rise time $t$ is found by intersecting the curve 9 by the level 14, representing 10 percent of the full peak to peak value of the curve, and by the level 15, representing 90 percent of the full peak to peak value of the curve. The horizontal distance between the point of intersection 16 of the 10 percent level 14 and the curve 9 and the point of intersection 17 of the 90 percent level 15 and the curve 9 is the rise time $t$. The velocity $v$ of the spot across the screen 2 of the cathode ray tube 1 is determined by the sweep voltage generator 3 and is thus known.

The spot size is the product of the known velocity $v$ and the measured rise time $t$ divided by 1.80.

Obviously many modifications and variations of the present invention are possible in the light of the above teachings. It is therefore to be understood that within the scope of the appended claims the invention may be practiced otherwise than as specifically described.

I claim:

1. Apparatus for measuring the size of a constant intensity spot produced by an electron beam on the screen of a cathode ray tube comprising, a phototube adapted to be disposed close to and in fixed position relative to the screen of the cathode ray tube to intercept luminous energy radiated from the screen of the cathode ray tube, opaque means having a straight sharp edge, said opaque means disposed between and in fixed position relative to the cathode ray tube and said phototube and intercepting and completely blocking from said phototube luminous energy originating at a portion of the screen of the cathode ray tube, a recording cathode ray tube, linear constant-velocity sweep circuit means adapted to be connected to the first-mentioned cathode ray tube and connected to said recording cathode ray tube, said sweep circuit means being operative to sweep a spot completely across the screen of said recording cathode ray tube during an interval that is somewhat longer than the interval for a spot on the screen of the first-mentioned cathode ray tube to move past a given point, means coupling said phototube to said recording cathode ray tube to deflect the spot thereof orthogonally to the direction of sweep to an extent that is related to the luminous flux reaching said phototube from the screen of the first-mentioned cathode ray tube.

2. Apparatus for measuring the size of a constant intensity spot produced by an electron beam on the screen of a cathode ray tube as defined in claim 1 further including lens means in line with and between and in fixed position relative to said phototube and the first-mentioned cathode ray tube.

References Cited in the file of this patent

UNITED STATES PATENTS

| 2,494,441 | Hillier | Jan. 10, 1950 |
| 2,540,943 | Hales | Feb. 6, 1951 |
| 2,645,971 | Herbst | July 21, 1953 |
| 2,680,200 | Hercock | June 1, 1954 |
| 2,731,597 | Schade | Jan. 17, 1956 |